UNITED STATES PATENT OFFICE.

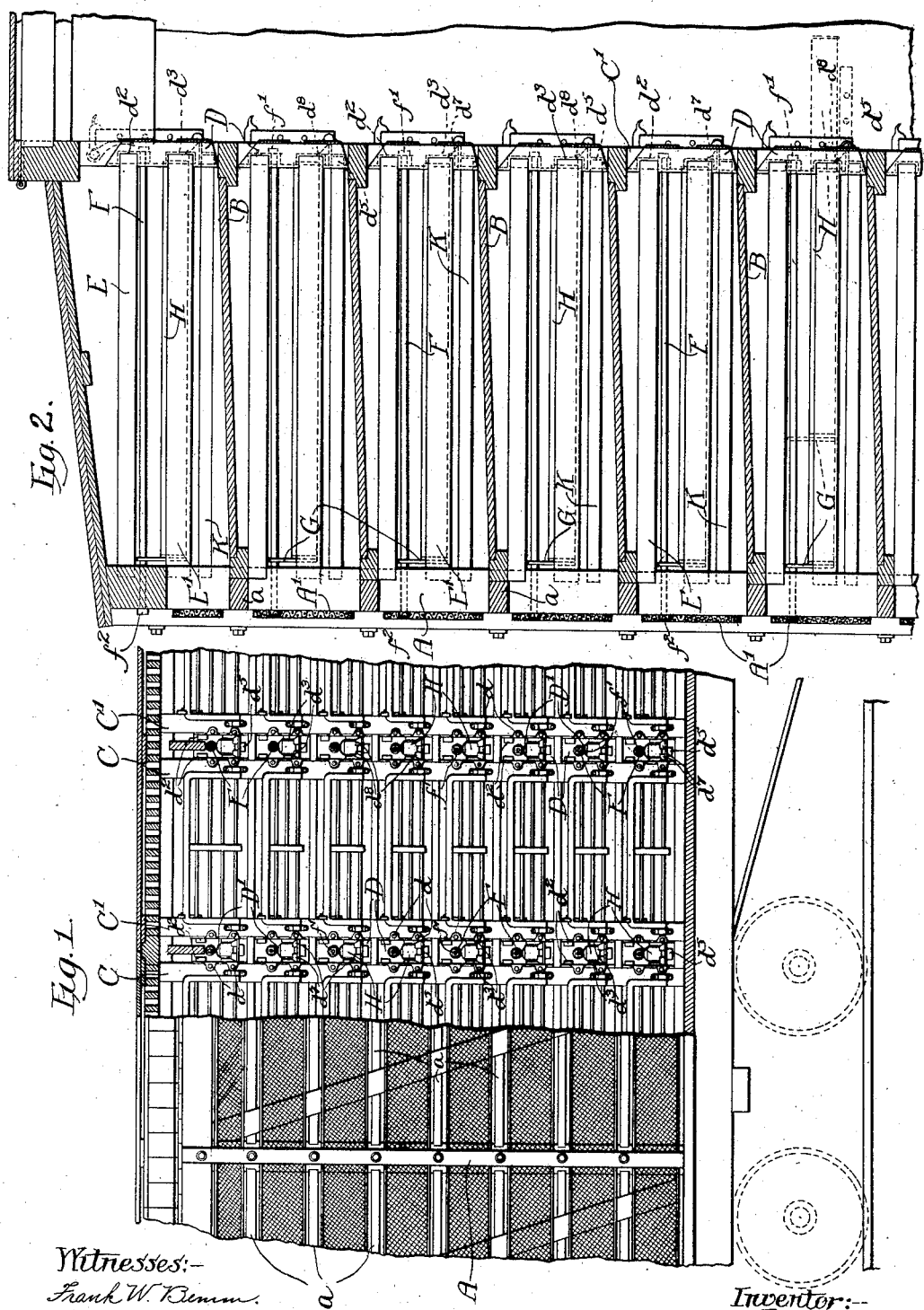

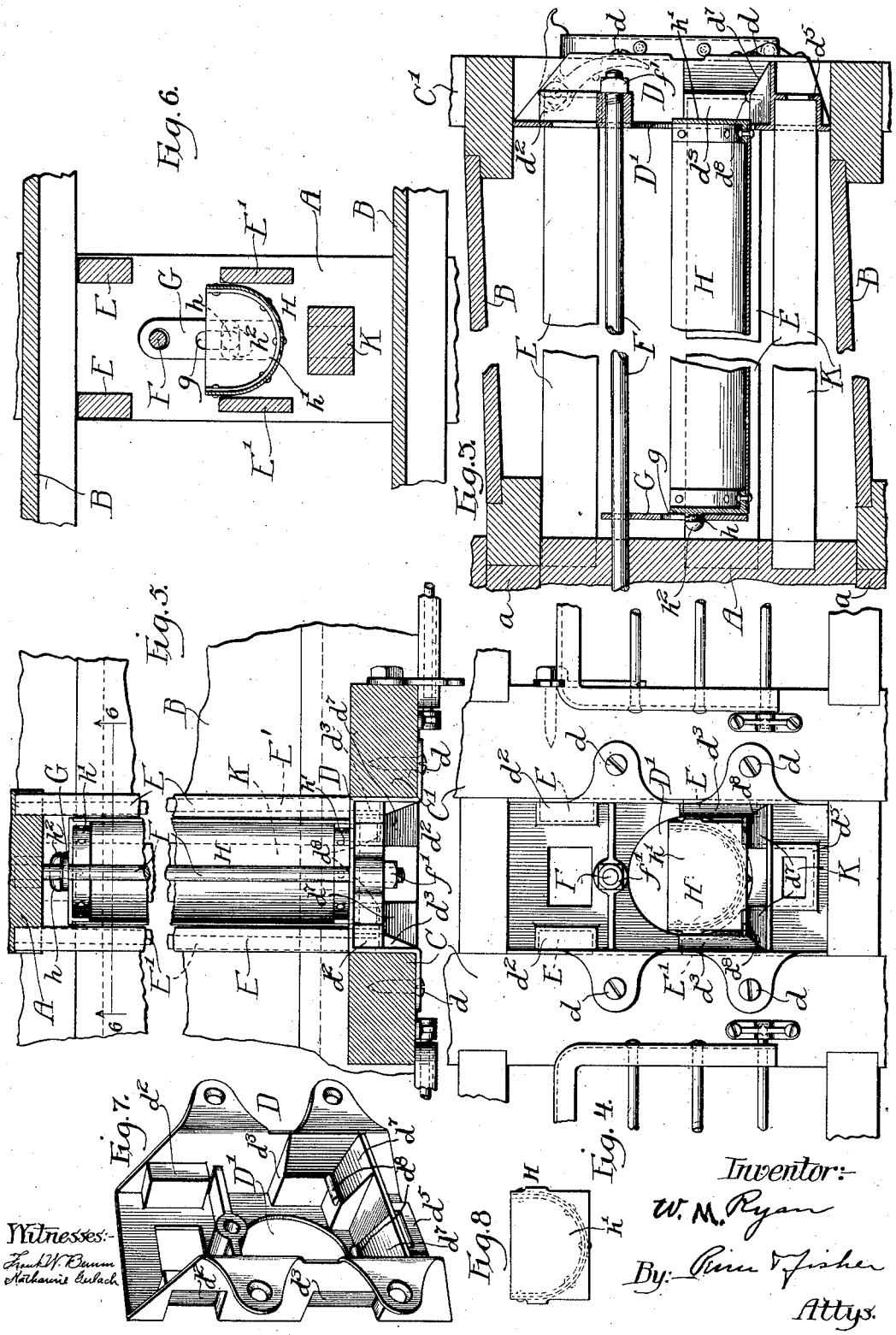

WILLIAM M. RYAN, OF CHICAGO, ILLINOIS, ASSIGNOR TO LEMAC CARRIERS COMPANY, OF CHICAGO, ILLINOIS, A CORPORATION OF ILLINOIS.

POULTRY-CAR.

998,401.  Specification of Letters Patent.  Patented July 18, 1911.

Application filed April 10, 1909. Serial No. 489,216.

*To all whom it may concern:*

Be it known that I, WILLIAM M. RYAN, a citizen of the United States, residing at Chicago, in the county of Cook and State of Illinois, have invented certain new and useful Improvements in Poultry-Cars, of which I do declare the following to be a full, clear, and exact description, reference being had to the accompanying drawings, forming part of this specification.

The present invention has relation, more particularly, to that class of poultry cars in which the coops are arranged in tiers, one above the other, at the opposite side of its central aisle, provision being made whereby the troughs that supply the food and water to the poultry may be readily inserted into and withdrawn through openings at the sides of the aisle. An example of this type of poultry car is illustrated in Letters Patent No. 910,865, granted to the Ryan Car Company, January 26, 1909.

The object of the invention is, first, to provide improved means for sustaining the feed troughs and, second, to so arrange the coops that a space will be left between adjoining coops to receive the feed troughs.

The invention consists in the features of novelty hereinafter described, illustrated in the accompanying drawings and particularly defined in the claims at the end of this specification.

Figure 1 is a view of a portion of a car embodying my invention, parts being shown in section and parts in side elevation. Fig. 2 is a view in vertical cross-section through half of the car, the section being at one side of the feed troughs. Fig. 3 is a view in vertical, longitudinal section through a space between the coops and through one of the feed troughs. Fig. 4 is a front view showing the aisle end of one of the feed troughs, means for sustaining it and adjacent parts. Fig. 5 is a view in horizontal section above one of the feed troughs. Fig. 6 is a view in transverse section through one of the feed troughs and adjacent parts. Fig. 7 is a perspective view of one of the plates or castings for sustaining a feed trough. Fig. 8 is an end view of one of the feed troughs.

In the drawings, the outer walls of the car-body, which form the outer ends of the coops, are shown as comprising vertical posts A, between which extend the transverse bars $a$, forming openings that will be covered by the usual sheets of wire netting A'. Suitable flooring B will divide the car-body into tiers, and will form the floors of the various coops. At the aisle ends of the coops there will be arranged vertical posts C and C' and between these posts C and C', as in the above mentioned Letters Patent No. 910,865, there will be arranged suitable plates or castings D that will be conveniently secured, as by screws $d$, to the inner faces of the posts C and C'. The plates or castings D are shown as formed upon their inner faces with lugs $d^2$ and $d^3$, forming sockets to receive the inner ends of the wooden bars E and E' that extend lengthwise of the coops, the outer ends of these bars E and E' being secured within seats formed in the inner faces of the vertical posts A at their edges.

Beneath the upper bars E, which separate the adjoining coops one from another, extend the suspension rods F, the outer ends of these rods passing through holes formed in the outer posts A, while the inner ends of these rods pass through holes formed in the castings D, retaining nuts $f'$ being secured upon the inner and outer ends of the rods to hold them in place. Upon each of the rods F is mounted, in manner free to slide thereon, a hanger G, in the lower end of which is preferably formed an oblong slot or hole $g$ adapted to receive a trunnion stud $h$ that projects outwardly from the end $h'$ of the corresponding feed trough H. The trunnion stud $h$ is formed with an expanded end $h^2$, preferably of oblong shape, which serves to prevent the accidental slipping of the trunnion stud $h$ from the slot $g$ of the hanger. It will be understood, however, that when the trough is turned a quarter of a revolution, the oblong head $h^2$ of the trunnion stud may be readily inserted through the slot $g$ of the hanger. The outer end of the trough H extends through an opening D' formed in the corresponding front plate or casting D and has secured thereto a front plate $h'$. As shown, said front plate $h'$ of each trough H is formed with a square lower edge which, as the trough is slipped into position for use, will ride up over the inclines $d^7$ that are formed on the front of corresponding plate D and will pass behind the retaining lugs $d^8$ at the top of these inclines, these retaining lugs $d^8$ serving to hold the trough against accidental displacement. Inasmuch as the aisle end of the trough H is formed with a part or plate $h'$ which projects beyond the periphery of the trough and is adapted to enter between the lugs $d^3$ of the casting D, said plate or part $h'$ will effectively serve to prevent the accidental turning of the trough and the spilling of its contents after the trough has been placed in position for use, as shown in the drawings. The space between the inclines $d^7$ serves as a convenient means whereby the lower end of the trough plate $h'$ may be grasped to withdraw the trough.

By reference more particularly to Figs. 3 and 7 of the drawings it will be seen that that part of each of the castings D comprising the inclined portions $d^7$ and the flat surface in front of the lug $d^8$ forms a ledge or support adapted to receive and sustain the free end of a trough withdrawn from a corresponding coop oppositely located on the other side of the aisle of the car. This is a feature of advantage as it avoids the necessity for the attendant holding the free end of a trough when it has been drawn out to be filled, thus leaving both hands of the attendant free.

Preferably, bars K are extended between the outer vertical posts A and the lower portion of the castings D, the aisle end of these bars K setting within sockets $d^5$ formed in the castings, while the opposite ends of these bars K set within holes or seats formed in the inner faces of the posts A.

By suspending the inner ends of the troughs by means of the hangers G, the troughs and the hangers can be readily drawn out for the purpose of filling or emptying them and, when the troughs are thus drawn out, they can—without detachment from their hangers G—be revolved so as to readily dump the refuse material therefrom, and the troughs having been filled with fresh food can then be slipped back to position for use. When it is desired to disconnect the troughs H from the hangers G, the troughs will be turned a quarter of a revolution and the headed ends $h^2$ of the trunnion studs $h$ will then pass freely through the slots $g$ of the hangers G.

By providing the upper and lower sets of partition bars E and E', a compartment is formed between the coops to receive the troughs. The bars E and E' will be at such distance apart as to prevent the poultry from passing into this compartment between the coops, and the upper bars E will also serve to prevent the poultry from roosting upon the bars E', or in any manner fouling the troughs or space in which the troughs H are carried. It will be understood, of course, that the space between the upper and lower bars E and E' will be sufficient to permit the poultry from either coop to feed from the trough H.

My invention affords an exceedingly simple, cheap and effective means for sustaining the feed troughs so they can be readily withdrawn from the coops and replaced when desired, and by the separation of the coops by the partition bars E and E' ample space is provided between the coops for the reception of the feed troughs.

Having thus described my invention, what I claim as new, and desire to secure by Letters Patent, is:—

1. In a poultry car, the combination with a pair of adjoining coops, of a suspension rod extending lengthwise of and between said coops, a longitudinally movable trough arranged beneath said suspension rod and revolubly supported to permit its contents to be dumped when the trough is withdrawn into the aisle, a hanger slidably mounted on said rod and to which hanger the inner end of said trough is revolubly connected and means on said trough for preventing rotary movement thereof when said trough is in its position of use.

2. In a poultry car, the combination with a pair of adjoining coops, of a trough extending longitudinally between said coops and withdrawable into the aisle of the car, means for supporting said trough in manner permitting the same to be turned when withdrawn to dump its contents, said trough having one end provided with a projecting part and said supporting means having a space to receive the projecting part of the trough to prevent the accidental turning of the trough when in position for use.

3. In a poultry car, the combination with a pair of adjoining coops, of a trough extending longitudinally between said coops and withdrawable into the aisle of the car, means for supporting said trough in manner permitting the same to be turned when withdrawn to dump its contents, said trough having one end provided with a part projecting beyond the periphery of the trough and arranged to interlock with a fixed part of the structure to prevent the accidental turning of the trough when in position for use.

4. In a poultry car, the combination with a pair of adjoining coops, of a trough extending longitudinally between said coops and a support for slidably sustaining said trough in manner permitting it to be withdrawn into the aisle of the car and to be turned to dump its contents, one of said parts having a rigid lug adapted to automatically engage and disengage the other of said parts when the trough is moved to and from position for use and whereby the accidental displacement of the trough is prevented.

5. In a poultry car, the combination with a pair of adjoining coops, of a rotatable trough extending longitudinally between said coops and withdrawable into the aisle of the car, a plate or support for the front end of said trough, said plate or support being provided with a fixed lug adapted to directly engage the end of the trough to hold said trough against both longitudinal and rotary displacement.

6. A poultry car of the character described, comprising tiers of coops, troughs extending transversely of said tiers of coops and longitudinally withdrawable through the aisle side thereof, and a ledge extending below the inner end of each trough and toward the aisle and having an upwardly projecting part for preventing the longitudinal displacement of the trough, said ledge being adapted to sustain the free end of the trough when drawn from the tiers of the coops at the opposite side of the aisle.

7. A poultry car of the character described, comprising tiers of coops, two laterally spaced vertical partitions for forming distinct trough compartments between each tier of adjacent coops, each of said partitions comprising upper and lower side bars, said compartments having openings at their outer ends, troughs in said compartments longitudinally withdrawable through said openings, and means for slidably supporting said troughs between the lower side bars of said partitions, substantially as described.

8. In a poultry car, the combination with a pair of adjoining coops, of a suitably supported, longitudinally slidable feed trough, an end plate having an opening through which said feed trough passes and wherein it is revolubly mounted, said supporting plate having at its front an inclined part whereon the end plate of the feed trough may ride and having a lug to engage the end of the feed trough to hold it in position.

9. A poultry car of the character described, comprising tiers of coops, troughs extending transversely of said tiers of coops and longitudinally withdrawable through the aisle side of said coops, and a projecting ledge or support extending below the inner end of each trough and toward the aisle, said ledge being adapted to sustain the free end of a trough withdrawn from a coop at the opposite side of the aisle.

10. A poultry car of the character described, comprising tiers of coops, troughs extending transversely of said tiers of coops and longitudinally withdrawable thrugh the aisle partition of said coops and plates supported opposite the inner ends of said troughs, each of said plates being provided with a projecting ledge or support extending below the inner end of each trough and toward the aisle, said ledge being adapted to sustain the free end of a trough withdrawn from a coop at the opposite side of the aisle.

WILLIAM M. RYAN.

Witnesses:
 Geo. P. Fisher, Jr.,
 Katharine Gerlach.

---

Copies of this patent may be obtained for five cents each, by addressing the "Commissioner of Patents, Washington, D. C."